US012785202B2

(12) United States Patent
Kim et al.

(10) Patent No.: US 12,785,202 B2
(45) Date of Patent: Nov. 3, 2026

(54) SECONDARY BATTERY

(71) Applicant: LG Energy Solution, Ltd., Seoul (KR)

(72) Inventors: Do Yul Kim, Daejeon (KR); Dong Wan Ko, Daejeon (KR); Ki Young Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 786 days.

(21) Appl. No.: 17/921,466

(22) PCT Filed: Apr. 27, 2021

(86) PCT No.: PCT/KR2021/005323
§ 371 (c)(1),
(2) Date: Oct. 26, 2022

(87) PCT Pub. No.: WO2021/230536
PCT Pub. Date: Nov. 18, 2021

(65) Prior Publication Data

US 2023/0178843 A1 Jun. 8, 2023

(30) Foreign Application Priority Data

May 13, 2020 (KR) ........................ 10-2020-0057375

(51) Int. Cl.
*H01M 50/325* (2021.01)
*H01M 10/48* (2006.01)
*H01M 50/105* (2021.01)

(52) U.S. Cl.
CPC ......... *H01M 50/325* (2021.01); *H01M 10/48* (2013.01); *H01M 50/105* (2021.01); *H01M 2200/20* (2013.01)

(58) Field of Classification Search
CPC .. H01M 50/325; H01M 50/105; H01M 10/48; H01M 2200/20
See application file for complete search history.

(56) References Cited

U.S. PATENT DOCUMENTS

2005/0277017 A1 12/2005 Cho
2010/0112436 A1 5/2010 Mizuta et al.
(Continued)

FOREIGN PATENT DOCUMENTS

CN 107735883 A 2/2018
CN 108028334 A 5/2018
(Continued)

OTHER PUBLICATIONS

KR-20170020997-A—Machine Translation (Year: 2017).*
(Continued)

*Primary Examiner* — Brian R Ohara
*Assistant Examiner* — Patrick Marshall Greene
(74) *Attorney, Agent, or Firm* — Lerner David LLP

(57) ABSTRACT

The present invention relates to a secondary battery. The secondary battery according to the present invention comprises an electrode assembly wherein electrodes and separators are alternatingly stacked, and a battery case in which the electrode assembly is accommodated, where the battery case comprises a first gas pocket on which a first collection space for collecting gases in the battery case is formed, and on which is provided a first exhaust port from which gases in the first collection space are exhausted, and a second gas pocket on which a second collection space for collecting gases exhausted from the first exhaust port is formed, and on which is provided a second exhaust port for outward exhaust of gas in the second collection space.

14 Claims, 5 Drawing Sheets

(56) References Cited

U.S. PATENT DOCUMENTS

| | | | | |
|---|---|---|---|---|
| 2014/0205869 | A1 | 7/2014 | Mizuta et al. | |
| 2016/0315301 | A1* | 10/2016 | Kim | H01M 50/3425 |
| 2018/0183026 | A1* | 6/2018 | Matsumoto | H01M 50/3425 |
| 2018/0183027 | A1 | 6/2018 | Lee et al. | |
| 2018/0248160 | A1 | 8/2018 | Lee | |
| 2020/0028128 | A1 | 1/2020 | Hwang et al. | |
| 2020/0321577 | A1 | 10/2020 | Kim et al. | |
| 2020/0373535 | A1 | 11/2020 | Jo | |
| 2021/0020884 | A1* | 1/2021 | Nakano | H01M 50/394 |
| 2021/0265699 | A1* | 8/2021 | Lee | H01M 50/342 |
| 2022/0367964 | A1* | 11/2022 | Kawai | H01M 50/30 |
| 2023/0178843 | A1 | 6/2023 | Kim et al. | |

FOREIGN PATENT DOCUMENTS

| | | | | |
|---|---|---|---|---|
| CN | 111033799 | A | 4/2020 | |
| CN | 115428247 | A | 12/2022 | |
| DE | 102018126573 | A1 | 4/2020 | |
| JP | 2007134535 | A | 5/2007 | |
| JP | 4154888 | B2 | 9/2008 | |
| JP | 2010086753 | A | 4/2010 | |
| JP | 2010153356 | A | 7/2010 | |
| JP | 2012015121 | A | 1/2012 | |
| JP | 2012069404 | A | 4/2012 | |
| JP | 2012129023 | A | 7/2012 | |
| JP | 2013152939 | A | 8/2013 | |
| JP | 5601253 | B2 | 10/2014 | |
| JP | 2016009677 | A | 1/2016 | |
| JP | 2020055587 | A | 4/2020 | |
| JP | 2020056445 | A | 4/2020 | |
| KR | 20030039703 | A | 5/2003 | |
| KR | 20140015647 | A | 2/2014 | |
| KR | 20150061996 | A | 6/2015 | |
| KR | 101600138 | B1 | 3/2016 | |
| KR | 101650858 | B1 | 8/2016 | |
| KR | 20170020997 | A * | 2/2017 | H01M 10/049 |
| KR | 101723035 | B1 | 4/2017 | |
| KR | 20170043926 | A | 4/2017 | |
| KR | 101748362 | B1 | 6/2017 | |
| KR | 101833540 | B1 | 3/2018 | |
| KR | 20180106073 | A | 10/2018 | |
| KR | 20180113855 | A | 10/2018 | |
| KR | 20190042953 | A | 4/2019 | |
| KR | 20200025909 | A | 3/2020 | |

OTHER PUBLICATIONS

International Search Report for Application No. PCT/KR2021/005323 mailed Aug. 6, 2021, pp. 1-3.

Extended European Search Report including Written Opinion for Application No. 21803818.0 dated Aug. 1, 2024, pp. 1-7.

* cited by examiner

[FIG. 1]
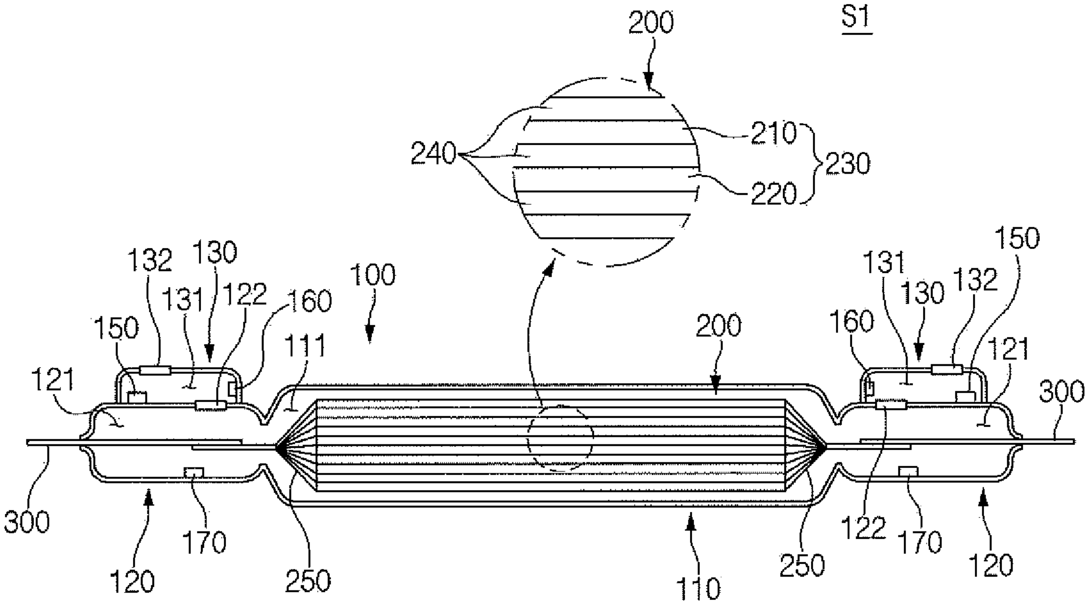
[FIG. 2]
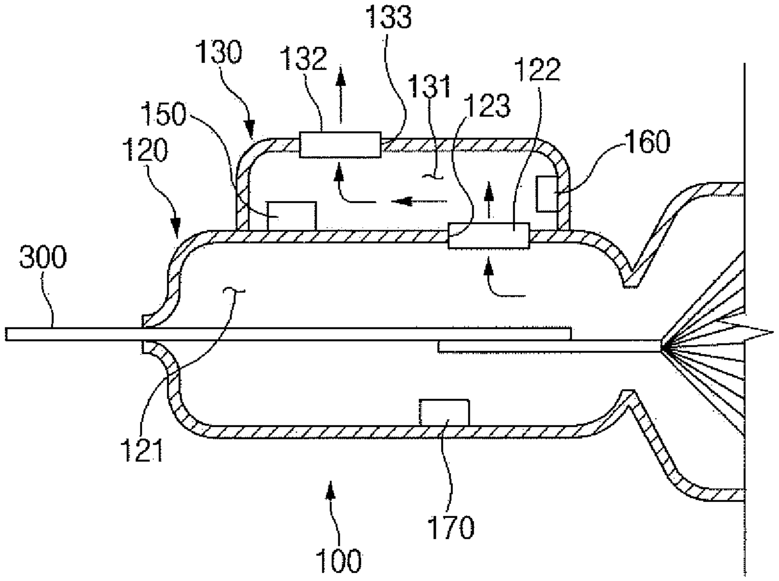

[FIG. 3]
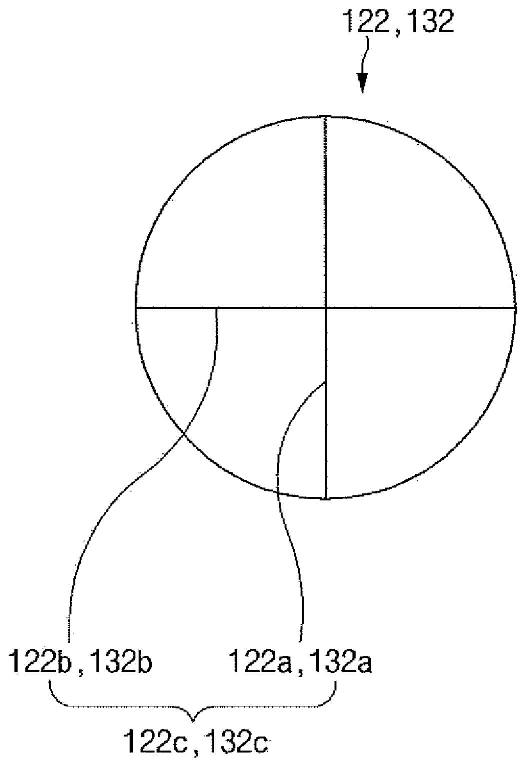
[FIG. 4]
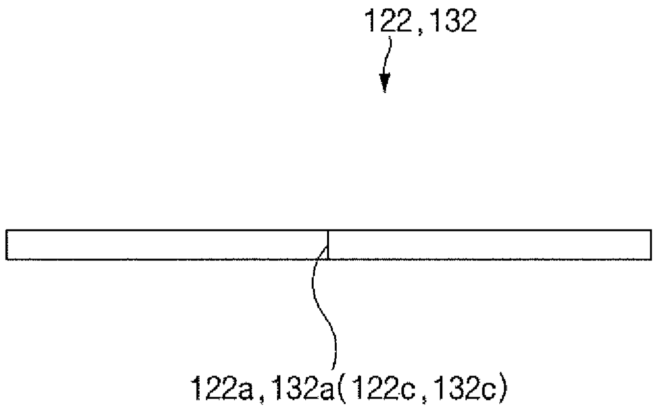

[FIG. 5]
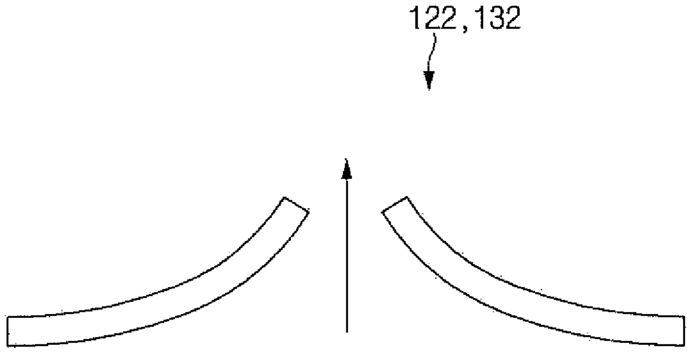
[FIG. 6]
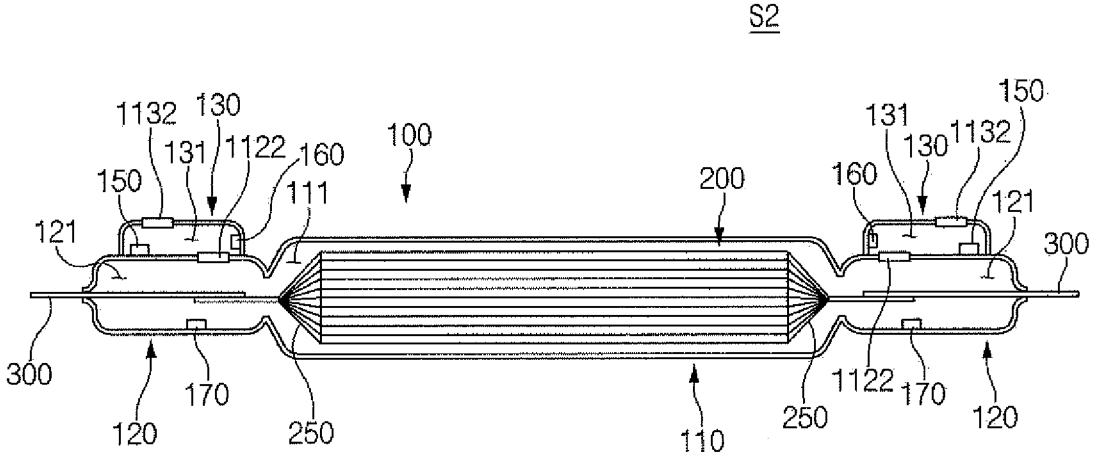

[FIG. 7]
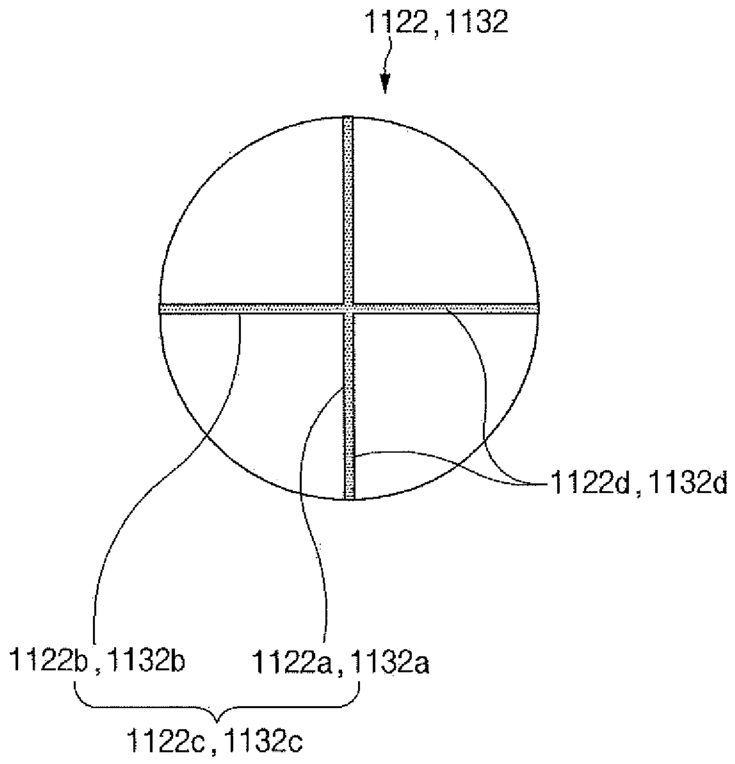
[FIG. 8]
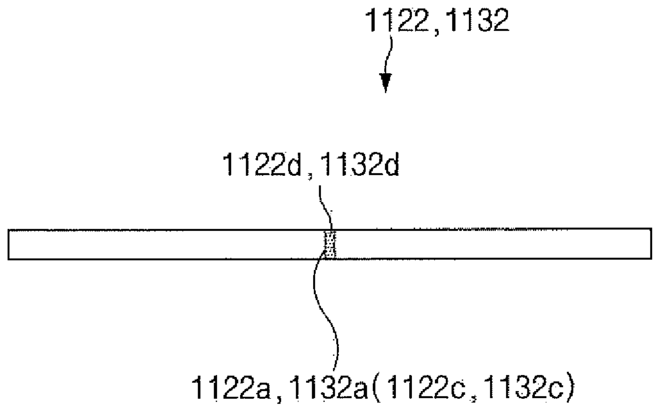

[FIG. 9]
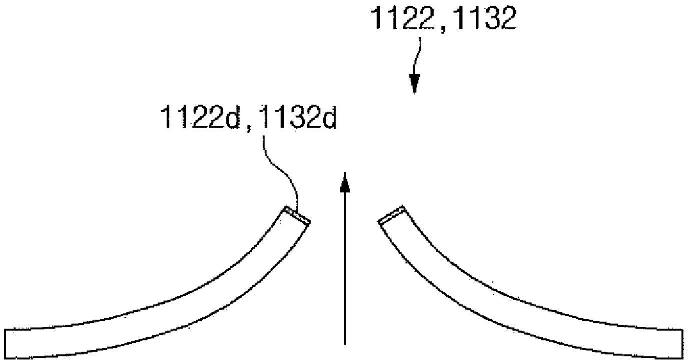

SECONDARY BATTERY

CROSS-REFERENCE TO RELATED APPLICATION

This application is a national phase entry under 35 U.S.C. § 371 of International Application No. PCT/KR2021/005323, filed on Apr. 27, 2021, which claims priority to Korean Patent Application No. 10-2020-0057375 filed on May 13, 2020, the entire contents of which are hereby incorporated herein by reference.

TECHNICAL FIELD

The present invention relates to a secondary battery.

BACKGROUND ART

Secondary batteries are being researched and developed extensively recently, due to their being rechargeable unlike primary batteries and their potential for large capacity and small size. With increased technology development and demand for mobile devices, demand for secondary batteries as an electrical power source therefor is also rapidly increasing.

Secondary batteries are categorized into coin type batteries, cylindrical batteries, prismatic batteries and pouch type batteries depending on the shape of the battery case. A secondary battery accommodates an electrode assembly and an electrolyte solution. In a secondary battery, the electrode assembly mounted inside the battery case is a chargeable and dischargeable generating element comprised of a layered electrode and separator structure.

Electrode assemblies can be approximately categorized as jelly-rolls wherein a separator membrane is interposed between a sheet type cathode and anode on which an active material is applied, stacks wherein a plurality of cathodes and anodes are sequentially stacked with separator membranes interposed therebetween, and stacked/folded assemblies when stack type unit cells are wound using a long separating film.

A conventional pouch type battery is comprised of an electrode assembly accommodated within a pouch. When charging and discharging, such pouch type battery repeatedly swells and contracts due to gas generation. Here, if the generated gas remains within the pouch, it causes reduced battery performance and changes in volume, and this causes the problem of adverse impact on nearby batteries and structures. Further, if the gas generated exceeds the limit that can be accommodated by the pouch, a venting phenomenon wherein a structurally weak part ruptures and leaks gas occurs. Venting causes leakage of electrolyte solution, and the battery reaches the end of its life.

Document of Related Art (Patent Document 1) Korean Laid-open Patent No. 10-2014-0015647

DISCLOSURE

Technical Problem

The purpose of one aspect of the present invention is to provide a secondary battery equipped with a gas pocket to collect internal gas, and which is able to exhaust collected gas.

Technical Solution

The secondary battery according to an embodiment of the present invention may be comprised of an electrode assembly wherein electrodes and separator membranes are alternatingly stacked, and a battery case wherein the electrode assembly is accommodated, and the battery case may comprise a first gas pocket in which is formed a first collecting space for collecting internal gases of the battery case, and which is equipped with a first exhaust port through which gases in the first collecting space are exhausted, and a second gas pocket in which is formed a second collecting space for collecting gases exhausted from the first exhaust port of the first gas pocket, and which is equipped with a second exhaust port through which gases in the second collecting spaces are exhausted outward.

Meanwhile, the battery pack according to an embodiment of the present invention may be a battery pack comprising the secondary battery according to an embodiment of the present invention.

Advantageous Effects

According to the present invention, by providing double gas pockets for collecting internal gases, a large space for collecting internal gases can be secured, and direct contact between outside air and air inside a battery can be avoided.

Further, by forming gas exhaust ports which open at a certain pressure or higher on the respective dual gas pockets, it is possible to easily exhaust the gases accommodated in the gas pockets, preventing the rupture and leakage of gases through structurally weak parts of a battery case, and thereby preventing leakage of electrolyte solution and extending the life of the battery.

Further, by positioning a gas sensor within the gas pocket, it is possible to measure the occurrence of gases in a collection space, or to measure the constitution of the gas.

Further, by placing an air pressure sensor within the gas pocket, it is possible to measure air pressure in the collection space, which facilitates monitoring of battery status.

DESCRIPTION OF DRAWINGS

FIG. 1 is a cross sectional diagram illustrating the secondary battery according to one embodiment of the present invention.

FIG. 2 is a cross section illustrating an essential part of the secondary battery according to one embodiment of the present invention.

FIG. 3 is a plan diagram illustrating the first and second exhaust ports of the secondary battery according to one embodiment of the present invention.

FIG. 4 is a cross section illustrating a closed status of the first and second exhaust ports of the secondary battery according to one embodiment of the present invention.

FIG. 5 is a cross section illustrating an open status of the first and second exhaust ports of the secondary battery according to one embodiment of the present invention.

FIG. 6 is a cross section illustrating a secondary battery according to another embodiment of the present invention.

FIG. 7 is a plan diagram illustrating the first and second exhaust ports of the secondary battery according to another embodiment of the present invention.

FIG. 8 is a cross section illustrating a closed status of the first and second exhaust ports of the secondary battery according to another embodiment of the present invention.

FIG. 9 is a cross section illustrating an open status of the first and second exhaust ports of the secondary battery according to another embodiment of the present invention.

MODE FOR INVENTION

The purpose, specific benefits and novel characteristics of the present invention will become more evident from the following detailed description and preferred embodiments associated with the attached drawings. It shall be noted that in assigning reference numbers to the component elements of the respective drawings of the present specification, like elements are made to have like numbers anywhere possible even if they are represented in different drawings. Further, the present invention may be carried out in numerous different forms, and is not limited to the embodiments described herein. Also, in describing the present invention, detailed description of known art which may unnecessarily cloud the gist of the present invention shall be omitted.

Secondary Battery According to One Embodiment

FIG. 1 is a cross sectional diagram illustrating the secondary battery according to one embodiment of the present invention, and FIG. 2 is a cross section illustrating an essential part of the secondary battery according to one embodiment of the present invention.

Referring to FIG. 1 and FIG. 2, the secondary battery S1 according to one embodiment of the present invention comprises an electrode assembly 200 and a battery case 100 in which the electrode assembly 200 is accommodated, where the battery case 100 comprises a first gas pocket 120 in which is formed a first collection space 121 and which is equipped with a first exhaust port 122 from which gas is exhausted, and a second gas pocket 130 in which is formed a second collection space 131 and which is equipped with a second exhaust port 132 from which gas is exhausted.

Further, the secondary battery S1 according to one embodiment of the present invention may further comprise a gas sensor 150 which detects occurrence of gases or measures the constitution of gas, and an air pressure sensor 160, 170 which measures air pressure.

In further detail, the electrode assembly 200, as a chargeable and dischargeable generating element, may consist of alternatingly stacked electrodes and separators. Here, an electrode tab 250 provided at an end of the electrode assembly 200 and an electrode lead may be connected to connect the electrode assembly 200 with an external device.

The electrode 230 may be comprised of a cathode 210 and an anode 220. Here, the electrode assembly 200 may consist of a structure wherein a cathode 210/separator 240/anode 220 are alternatingly stacked.

Also, the electrode lead 300 may comprise a cathode lead which is connected to a cathode tab provided at an end of the cathode 210, and an anode lead which is connected to an anode tab provided at an end of the anode 220.

The cathode 210 may comprise a cathode current collector, and a cathode active material laminating the cathode current collector.

The cathode current collector may be formed of an aluminum foil.

The cathode active material may be formed of lithium-manganese oxide, lithium-cobalt oxide, lithium-nickel oxide, lithium iron phosphate, or compounds and mixtures comprising at least one of these.

The anode 220 may comprise an anode current collector, and an anode active material laminating the anode current collector.

The anode current collector may be formed of, for example, a copper (Cu) foil.

The anode active material may be a compound or mixture comprising a graphite-based material.

The separator 240 is formed of insulating material and electrically insulates the cathode 210 and the anode 220. Here, the separator 240 may be formed of a microporous polyolefin resin membrane such as polyethylene or polypropylene.

The battery case 100 may accommodate the electrode assembly 200.

The battery case 100 comprises a first gas pocket 120 in which a first collection space 121 is formed and which is equipped with a first exhaust port 122, and a second gas pocket 130 in which a second collection space 131 is formed and which is equipped with a second exhaust port 132.

Also, the battery case 100 may further comprise a body 110 on which a housing 111 accommodating the electrode assembly 200 is formed.

The first gas pocket 120 may have a first collection space 121 in which internal gases of the battery case 100 are collected, and a first exhaust port 122 from which gases in the first collection space 121 are discharged.

Further, the first gas pocket 120 may extend along a side of the body 110 so that the housing 111 and the first collection space 121 are linked. Here, the first gas pocket 120 may be positioned at an end of the body 110 where the electrode lead 300 is positioned. The first gas pocket 120 may be positioned at both ends of the body 110.

The first exhaust port 122 may be positioned above a first through-hole 123 which penetrates the first collection space 121 and the second collection space 131, controlling the opening and closing of the first through-hole 123.

The second gas pocket 130 may have a second collection space 131 in which gases exhausted from the first exhaust port 122 of the first gas pocket 120 are collected, and a second exhaust port 132 from which gases in the second collection space 131 are exhausted outward.

The second gas pocket 130 may be provided above the first gas pocket 120 so that the second collection space 131 and the first collection space 121 are connected through the first through-hole 123.

The second exhaust port 132 may be positioned above a second through-hole which penetrates the second collection space 131 and the exterior of the battery case 100, controlling the opening and controlling of the second through-hole 133.

Here, the first through-hole 123 and the second through-hole 133 may be provided at positions where they are not facing each other with respect to the direction in which gases are exhausted. Here, the first through-hole 123 and second through-hole 133 may be positioned at positions which do not face each other vertically.

FIG. 3 is a plan diagram illustrating the first and second exhaust ports of the secondary battery according to one embodiment of the present invention, FIG. 4 is a cross section illustrating a closed status of the first and second exhaust ports of the secondary battery according to one embodiment of the present invention, and FIG. 5 is a cross section illustrating an open status of the first and second exhaust ports of the secondary battery according to one embodiment of the present invention.

Referring to FIG. 3 through FIG. 5, the first exhaust port 122 and the second exhaust port 132 may be formed of elastic material and have a first opening 122*c* and a second opening 132*c* formed thereon, so that the first opening 122*c* and the second opening 132*c* open up at a certain pressure or higher, thereby opening the first through-hole 123 and the second through-hole 133.

Here, the elastic material may be formed of at least one of silicone, spandex, fluoroelastomer, ethylene, propylene rubber (EPR), styrene, butadiene rubber (SBR), and butyl rubber (PIB).

The first exhaust port 122 and second exhaust port 132 may be provided to have different opening pressures. Here, the first exhaust port 122 and the second exhaust port 132 may provided to have different opening pressures by being formed of materials having different elasticity. Thereby, by preventing the simultaneous opening of the first exhaust port 122 and the second exhaust port 132, direct contact between air outside the battery with air inside the battery can be prevented.

Here, the first exhaust port 122 may be provided with a greater opening pressure than that of the second exhaust port 132. Accordingly, the exhaust of gas through the first exhaust port 122 to the second exhaust port 132 can be facilitated.

Referring to FIG. 3, the first opening 122*c* and the second opening 132*c* may be formed of two to four incision lines 122*a*, 122*b*, 132*a*, 132*b*. Here, the first opening 122*c* and the second opening 132*c* may be formed of cross ("+") shaped incision lines 122*a*, 122*b*, 132*a*, 132*b*.

Referring to FIG. 4, when the first collection space 121 and second collection space 131 are below a certain pressure, the first incision 122*c* and the second incision 132*c* may close the first through-hole 123 and the second through-hole 133.

Referring to FIG. 5, when the first collection space 121 and the second collection space 131 are at a certain pressure or higher, the first incision 122*c* and the second incision 132*c* may open up along the incision lines 122*a*, 122*b*, 132*a*, 132*b* to open the first through-hole 123 and the second through-hole 133.

Referring to FIG. 1 and FIG. 2, the gas sensor 150 may be provided inside the second gas pocket 130 to detect the occurrence of gas in the second collection space 131 or measure the constitution of the gas. Here, the ability to detect a specific gas in the second gas pocket 130 through the gas sensor 150 may enable alarms for specific purposes. Here, the gas sensor 150 may detect the occurrence of carbon dioxide ($CO_2$).

Further, the gas sensor 150 may, when gas is generated, trigger at least one of a notification signal, notification sound, or a notification light. Here, the gas sensor 150 may, for example, when carbon dioxide (CO2) is detected, trigger at least one of a notification signal, notification sound, or a notification light. Here, the gas sensor 150 may comprise a notification speaker and notification LED to trigger a notification sound and notification light. Further, the gas sensor 150 may be connected to a monitoring apparatus to forward a triggered notification signal.

The air pressure sensor 160, 170 may be provided inside at least one of the first gas pocket 120 or the second gas pocket 130 to measure air pressure. Here, the air pressure sensor 160, 170 may be positioned in the first gas pocket 120 and the second gas pocket 130 to measure the air pressure in the first collection space 121 and the second collection space 131.

Here, the air pressure sensor 160, 170 may, for example, when the measured air pressure value is equal to or higher than a certain pressure level, trigger at least one of a notification sound or a notification light.

Further, in another example, the air pressure sensor 160, 170 may forward a measured air pressure value to a monitoring apparatus. Here, the monitoring apparatus may be, for example a battery management system (BMS).

The secondary battery S1 according to one embodiment of the present invention, which is configured as described in the foregoing, by comprising a first gas pocket 120 and a second gas pocket 130 which collect and exhaust gases, is able to safely secure sufficient space for collection of internal gases, and also exhaust internal gases in a manner so that air outside the battery does not come into direct contact with air inside the battery.

Further, by forming, on the first gas pocket 120 and the second gas pocket 130 respectively, a first exhaust port 122 and a second exhaust port 132 which open and discharge gas at or above a certain pressure, it is possible to readily exhaust gases accommodated in the first gas pocket 120 and the second gas pocket 130, which in turn can extend the life of a battery.

Also, it is possible to position a gas sensor 150 in the second gas pocket 130 to detect the occurrence of gas in the second collection space 131 or measure the constitution of the gas.

Secondary Battery According to Another Embodiment

In the following, a secondary battery according to another embodiment of the present invention will be described.

FIG. 6 is a cross section illustrating a secondary battery according to another embodiment of the present invention, FIG. 7 is a plan diagram illustrating the first and second exhaust ports of the secondary battery according to another embodiment of the present invention, FIG. 8 is a cross section illustrating a closed status of the first and second exhaust ports of the secondary battery according to another embodiment of the present invention, and FIG. 9 is a cross section illustrating an open status of the first and second exhaust ports of the secondary battery according to another embodiment of the present invention.

Referring to FIG. 6 through FIG. 9, the secondary battery S2 according to another embodiment of the present invention comprises an electrode assembly 200 and a battery case 100 which accommodates the electrode assembly 200, and the battery case 100 comprises a first gas pocket 120 on which a first collection space 121 is formed and which is equipped with a first exhaust port 1122 through which gas is exhausted, and a second gas pocket 130 on which a second collection space 131 is formed and which is equipped with a second exhaust port 132 through which gas is exhausted.

Further, the secondary battery S2 according to another embodiment of the present invention may further comprise a gas sensor 150 which detects the occurrence of gas or measures the constitution of gas, and an air pressure sensor 160, 170 which measures air pressure.

The secondary battery S2 according to another embodiment of the present invention, when compared against the secondary battery according to the first embodiment of the present invention described in the foregoing, differs in that an adhesive 1122*d*, 1132*d* is further disposed at the incision lines 1122*a*, 1122*b*, 1132*a*, 1132*b* of the first and second exhaust ports 1122, 1132. Therefore, in this second embodiment relating to this secondary battery S2, matters redundant with the previous first embodiment of a secondary battery will be omitted or stated briefly, with the description focusing on differences.

In further detail, the battery case 100 may accommodate an electrode assembly 200.

The battery case 100 comprises a first gas pocket 120 on which a first collection space 121 is formed and which is equipped with a first exhaust port 1122 through which gas is exhausted, and a second gas pocket 130 on which a second collection space 131 is formed and which is equipped with a second exhaust port 132 through which gas is exhausted.

Further the battery case 100 may further comprise a body 110 in which a housing 111 to accommodate the electrode assembly 200 is accommodated.

The first gas pocket 120 may have formed thereon a first collection space 121 wherein internal gases of the battery case 100 are collected, and may be equipped with a first exhaust port 1122 through which gases in the first collection space 121 are exhausted.

The first gas pocket 120 may extend along a side of the body 110 so that the housing 111 and the first collection space 121 are connected.

On the second gas pocket 130, a second collection space 131 wherein gases exhausted from the first exhaust port 1122 of the first gas pocket 120 are collected may be formed, and a second exhaust port 132 through which gases in the second collection space 131 are exhausted outward may be provided.

The second gas pocket 130 may be provided above the first gas pocket 120, so that the second collection space 131 and first collection space 121 are connected by a first through-hole.

The first exhaust port 1122 may be positioned above a first through-hole which penetrates the first collection space 121 and the second collection space 131, controlling the opening and closing of the first through-hole.

The second exhaust port 132 may be positioned above a second through-hole which penetrates the second collection space 131 and the outside of the battery case 100, controlling the opening and closing of the second through-hole.

The first exhaust port 1122 and the second exhaust port 132 may have a first incision 1122*c* and a second incision 1132*c* formed thereon, and be formed of elastic material, so that at a certain pressure or higher, the first incision 1122*c* and the second incision 1132*c* open up, opening the first through-hole and the second through-hole.

The first incision 1122*c* and the second incision 1132*c* may be formed of two to four incision lines 1122*a*, 1122*b*, 1132*a*, 1132*b*. Here, the first incision 1122*c* and the second incision 1132*c* may be formed of cross ("+") shaped incision lines 1122*a*, 1122*b*, 1132*a*, 1132*b*.

The first exhaust port 1122 and the second exhaust port 132 may be provided to have different opening pressures. Here, the first exhaust port 1122 and the second exhaust port 132 may be formed of materials having different elasticity, so that the opening pressures of the first exhaust port 1122 and the second exhaust port 132 are different from each other. Here, the opening pressure of the first exhaust port 1122 may be provided to be higher than the opening pressure of the second exhaust port 132.

The first exhaust port 1122 and the second exhaust port 132 may further include an adhesive 1122*d*, 1132*d* disposed on the first incision 1122*c* and the second incision 1132*c* to additionally seal the first incision 1122*c* and the second incision 1132*c*. The adhesive strength sealing the first incision 1122*c* and the second incision 1132*c* may be released when gas pressure causes the first incision 1122*c* and the second incision 1132*c* to open up.

Accordingly, through the adhesive 1122*d*, 1132*d*, the first incision 1122*c* and the second incision 1132*c* can be more tightly sealed, more effectively preventing the leakage of gas and electrolyte solution from the first incision 1122*c* of the first exhaust port 1122 and the second incision 1132*c* of the second exhaust port 132 at or below a certain pressure.

Further, a multitude of secondary batteries configured as described in the foregoing may be electrically linked to form a battery pack.

Whereas the present invention has been described in detail with reference to specific embodiments, these embodiments are intended to exemplify the present invention, and the secondary battery according to the present invention is not limited thereto. The present invention may be carried out in various forms by a person having ordinary skill in the art, without departing from the technical idea of the present invention.

Further, the specific scope of protection sought by the invention will become clear through the appended claims.

Whereas the present invention has been described in detail in the foregoing through specific embodiments, these embodiments are intended for describing in detail the present invention, and the secondary battery according to the present invention is not limited thereto. It shall be said that the present invention may be carried out in various forms by a person having ordinary skill in the art without departing from the technical idea of the invention.

Further, the specific scope of protection sought by the invention shall become clear through the appended claims.

EXPLANATION OF REFERENCE NUMERALS AND SYMBOLS

S1, S2: Secondary battery
100: Battery case
110: Body
111: Housing
120: First gas pocket
121: First collection space
122, 1122: First exhaust port
122*a*, 122*b*, 132*a*, 132*b*, 1122*a*, 1122*b*, 1132*a*, 1132*b*: Incision line
122*c*, 1122*c*: First incision
123: First through-hole
130: Second gas pocket
131: Second collection space
132, 1132: Second exhaust port
132*c*, 1132*c*: Second incision
133: Second through-hole
150: Gas sensor
160, 170: Air pressure sensor
200: Electrode assembly
210: Cathode
220: Anode
230: Electrode
240: Separator
250: Electrode tab
300: Electrode lead
1122*d*, 1132*d*: Adhesive

The invention claimed is:

1. A secondary battery comprising:

an electrode assembly in which electrodes and separators are alternatingly stacked, the electrode assembly having an electrode lead extending therefrom; and a battery case in which the electrode assembly is accommodated, the electrode lead extending through the battery case to an outside of the secondary battery, wherein the battery case comprises a first gas pocket in which a first collection space configured to receive gases from the electrode assembly is defined, and in which is provided a first exhaust port configured to receive a discharge therethrough of the gases in the first collection space, and a second gas pocket in which a second collection space configured to receive the gases exhausted from the first exhaust port is defined, and in which is provided a second exhaust port configured to receive a discharge therethrough of the gases in the second collection space, wherein the battery case comprises a body in which a housing accommodating the electrode assembly is defined, the first gas pocket extends along a side of the body so that the housing and the first collection space are connected, and the second gas pocket is provided above the first gas pocket, and wherein the first gas pocket has a first height in a first direction perpendicular to a major surface of the electrode assembly, the body of the battery case has a second height in the first direction, and the first gas pocket is separated from the body by an opening that has a third height in the first direction, the third height being less than the first height and the second height, and wherein the electrode lead extends through the first gas pocket.

2. The secondary battery of claim 1, wherein the first exhaust port is positioned above a first through-hole connecting the first collection space and the second collection space, the first exhaust port being configured to control opening and closing of the first through-hole, and the second exhaust port is positioned above a second through-hole connecting the second collection space and an outside of the battery case, the second exhaust port being configured to control opening and closing of the second through-hole.

3. The secondary battery of claim 2, wherein the first exhaust port and the second exhaust port have formed therein a first incision and a second incision, respectively, and are formed of elastic material, so that at or above a certain pressure, the first incision and the second incision are configured to open the first through-hole and the second through-hole, respectively.

4. The secondary battery of claim 3, wherein the first incision and the second incision each comprise 2 to 4 incision lines.

5. The secondary battery of claim 3, wherein the first incision and the second incision each comprise cross ("+") shaped incision lines.

6. The secondary battery of claim 3, wherein the first exhaust port and the second exhaust port each further comprise an adhesive disposed on the first incision and the second incision, respectively, to additionally seal the first incision and the second incision, and wherein an adhesive force sealing each of the first incision and the second incision is released when the respective first incision and the second incision are opened by gas pressure.

7. The secondary battery of claim 2, wherein the first exhaust port and the second exhaust port are each configured to have different opening pressures from each other.

8. The secondary battery of claim 2, wherein the first exhaust port and the second exhaust port are each formed of materials having different elasticities from each other, so that the first exhaust port and the second exhaust port are configured to have different opening pressures from each other.

9. The secondary battery of claim 7, wherein the opening pressure of the first exhaust port is greater than the opening pressure of the second exhaust port.

10. The secondary battery of claim 1, further comprising a gas sensor disposed inside the second gas pocket, the gas sensor being configured to detect a presence of the gases within the second collection space or to measure a constitution of the gases.

11. The secondary battery of claim 10, wherein the gas sensor is configured to detect a presence of carbon dioxide ($CO_2$).

12. The secondary battery of claim 10, wherein the gas sensor is configured to trigger at least one of a notification signal, notification sound, or notification light when the presence of the gases within the second collection space is detected.

13. The secondary battery of claim 1, further comprising an air pressure sensor disposed inside at least one of the first gas pocket or the second gas pocket, the air pressure sensor being configured to measure air pressure.

14. A battery pack comprising the secondary battery of claim 1.

* * * * *